United States Patent
Beaumont

(10) Patent No.: US 7,438,744 B2
(45) Date of Patent: Oct. 21, 2008

(54) METHOD AND SYSTEM FOR SEQUESTERING CARBON EMISSIONS FROM A COMBUSTOR/BOILER

(75) Inventor: E. Larry Beaumont, Littleton, CO (US)

(73) Assignee: eco/Technologies, LLC, Albany, NY (US)

( * ) Notice: Subject to any disclaimer, the term of this patent is extended or adjusted under 35 U.S.C. 154(b) by 490 days.

(21) Appl. No.: 11/129,013

(22) Filed: May 13, 2005

(65) Prior Publication Data

US 2005/0252215 A1  Nov. 17, 2005

Related U.S. Application Data

(60) Provisional application No. 60/571,431, filed on May 14, 2004.

(51) Int. Cl.
*B01D 50/00* (2006.01)
(52) U.S. Cl. ............... 95/92; 55/315; 55/315.2
(58) Field of Classification Search ........... 55/318, 55/385.1, 315.2, 315; 95/92; 47/17, 58.1
See application file for complete search history.

(56) References Cited

U.S. PATENT DOCUMENTS

| | | |
|---|---|---|
| 3,999,329 A | 12/1976 | Brais |
| 5,467,722 A | 11/1995 | Meratla |
| 5,747,042 A * | 5/1998 | Choquet ............ 424/725.1 |
| 6,105,309 A | 8/2000 | Takayanagi |
| 6,148,602 A | 11/2000 | Demetri |
| 6,170,264 B1 | 1/2001 | Viteri et al. |
| 6,205,704 B1 | 3/2001 | Schmitz et al. |
| 6,279,493 B1 | 8/2001 | Beaumont et al. |
| 6,344,177 B1 | 2/2002 | Littleford |
| 6,375,716 B1 | 4/2002 | Burchell et al. |
| 6,401,669 B1 | 6/2002 | Macgowan et al. |
| 6,446,385 B1 | 9/2002 | Crutcher |
| 6,447,437 B1 | 9/2002 | Lee et al. |
| 6,613,130 B2 | 9/2003 | Givargis |
| 6,619,041 B2 | 9/2003 | Marin et al. |
| 6,667,171 B2 | 12/2003 | Bayless et al. |
| 2004/0129188 A1 | 7/2004 | Traina |

OTHER PUBLICATIONS

Alamaro, Moshe, "*An Eco-Industrial Park of Power Generation and Food Production*," EAEE E4001 Presentation, 2003.

* cited by examiner

*Primary Examiner*—Robert A Hopkins
(74) *Attorney, Agent, or Firm*—Hoffmann & Baron, LLP

(57) ABSTRACT

A system for sequestering carbon emissions from a fuel combustor generally includes a combustion gas extraction module for extracting combustion gas from a fuel combustor and a greenhouse facility for receiving the extracted combustion gas and having at least one vegetation supporting soil bed for absorbing carbon dioxide from the received combustion gas. The extraction module includes a particulate removal unit for removing pollutants from the extracted combustion gas and a heat exchanger in downstream fluid communication with the particulate removal unit for cooling the extracted combustion gas.

22 Claims, 1 Drawing Sheet

METHOD AND SYSTEM FOR SEQUESTERING CARBON EMISSIONS FROM A COMBUSTOR/BOILER

CROSS-REFERENCE TO RELATED APPLICATIONS

This application claims the benefit of U.S. Provisional Application No. 60/571,431, filed on May 14, 2004.

FIELD OF THE INVENTION

The present invention relates generally to improvements in utility and industrial power generation facilities, particularly to those combusting any solid fuel or any fossil fuel in a combustor or boiler, and more particularly to a method and system for sequestering carbon emissions from such combustors or boilers using photosynthesis in an enclosed growth chamber to accelerate the production of biomass and soil amendments in the presence of high concentrations of carbon dioxide.

BACKGROUND OF THE INVENTION

Culminating with the Kyoto Treaty to reduce greenhouse gas (GHG) emissions in a worldwide effort to reverse the growing effects of global warming, research has been underway to create methods for achieving this goal. It is widely accepted that one of the greatest contributors to global warming is the emission of carbon dioxide ($CO_2$), which is a major product of utility and industrial power plant fuel combustion.

$CO_2$ emissions from power plants around the world, if left unchecked, are expected over the next century to rise from about 370 parts per million today to as high as 1,000 parts per million by the year 2100, as suggested by research conducted by the U.S. Department of Agriculture. Many believe that the only true, sustainable answer to global warming is a dramatic reduction in the overall emissions of $CO_2$, along with a renewable energy strategy that allows carbon to remain sequestered far below the earth's surface in the form of fossil fuels.

The field evolving from these concerns has become known as "carbon sequestration." To date, the primary research programs, especially those sponsored by the U.S. Department of Energy, have been in the area of burying $CO_2$ in geological formations under ground, under the ocean, or in abandoned mines. All of these strategies are extremely expensive and extremely risky in the event of natural disasters such as earthquakes, tsunamis, and the like.

Contrasting efforts have been made, and there are many patents existing, to create complicated chemical-based processes using catalysts, filters, and cryogenics for positive recovery of pure $CO_2$ for sale into commercial markets. For example, U.S. Pat. No. 5,467,722 to Mercatla uses compression of combustion flue gas and cryogenic separation of pure $CO_2$. U.S. Pat. No. 6,375,716 to Burchell separates $CO_2$ using a complex carbon fiber composite molecular sieve. Further, U.S. Pat. No. 6,447,437 to Lee uses a thermal reactor to convert flue gas constituents to fertilizer. However, the amount of $CO_2$ emitted into the atmosphere dwarfs the market for commercial usage, so these and similar approaches would not make a significant contribution to reducing atmospheric concentrations of $CO_2$ at a reasonable cost.

Further efforts have been made, such as in U.S. Pat. No. 6,619,041 to Marin and U.S. Pat. No. 6,148,602 to Demetri to use oxygen-enriched combustion or gasification to reduce $CO_2$ emissions. Although this approach is valid, the cost to implement is relatively high because of the need for constructing expensive oxygen enrichment facilities.

In contrast to these human-made solutions is nature's own carbon sequestration process called photosynthesis, whereby all vegetation uses the sun's light and takes up $CO_2$ through its leaves to convert $CO_2$ into carbon that is stored in the vegetation's biomass. A great deal of research, largely contributed to by the U.S. Department of Agriculture, is being conducted in the area of photosynthetic sequestration of carbon using open crop lands to absorb higher concentrations of $CO_2$, but this research is aimed at measuring the effects of higher atmospheric concentrations rather than in producing a reduction in the future.

This body of research has also shown that soils can serve as a valuable sink for carbon, but only to the point of achieving an optimum amount of carbon content in the soil, after which the soil cannot absorb much additional carbon. To the extent that the world has vast amounts of infertile soils, creating a strategy with an end product of widespread soil enhancement could have significant benefits in terms of food production, especially in developing countries, while making a major contribution to the reduction of global warming. In addition, if a second end product could be produced in the form of biomass to offset the need for unsequestering the world's buried fossil fuel reserves, a further major contribution could be made.

Several recent patents have addressed the potential for conversion of power plant flue gas to sequester carbon using photosynthesis. For example, U.S. Pat. No. 6,205,704 to Schmitz uses photosynthesis to accept flue gas from the combustion of landfill gas, but does not address major utility and industrial power plant emissions.

U.S. Pat. No. 6,667,171 to Bayless uses microbial cyanobacteria in the presence of solar photons to grow microbes on a plastic membrane inserted into a power plant flue gas stream. A high-pressure water stream is used to harvest the bacteria off of the membrane, but the patent does not address the cost of drying the biomass to provide feedstock for products such as fertilizer, alcohols, or power plant fuel. Because of the large volumes of water used in the harvesting process, this cost could be very high. In addition, the invention is limited to only certain cyanobacteria that can grow in temperatures in the narrow range of 50-70 degrees C. Therefore, a system is needed that will support the growth of a wide range of agricultural species to enable carbon sequestration in many products to maximize the world's potential carbon sequestration.

Long before the concept of global warming was understood, U.S. Pat. No. 3,999,329 to Brais disclosed a logical approach of providing an enclosed atmosphere suitable for plant growth and using the steps of supplying hot flue gas, cooling the flue gas to condense water vapor, keeping the water vapor and flue gas in intimate contact for a period sufficient for the water vapor to absorb at least a portion of the flue gases, and then spraying the condensed water vapor into the growth chamber while passing the cooled flue gas through the same chamber at low velocity.

The Brais patent describes a heat exchanger having a low heat transfer capacity for the purpose of maintaining condensed water vapor and flue gas in intimate contact for as long as possible. The purpose of this strategy was to allow absorption of acid gases and fly ash from the flue gas into the condensate, thus creating an ash-laden slurry for spraying onto plants in the growth chamber, or greenhouse. The Brais patent further specifies air as the cooling fluid for the heat exchanger, which is discharged to atmosphere, and further contemplates a treatment system for the ash-laden condensed water vapor slurry using chemicals prior to spraying on plants in the greenhouse.

One drawback of the Brais system is that the fly ash would likely plug the heat exchanger frequently and make it very difficult to operate reliably with consistent performance. Also, a commercial system of this type would be entirely dependent on proper performance of the heat exchanger, failure of which could adversely affect power plant availability. Other drawbacks include the waste of the heat removed from the flue gas by discharging the air cooling medium to atmosphere, the difficulty in pumping the ash-laden slurry through the system without frequent plugging and severe wear to pumps and valves, the likely damage caused to the plant growth in spraying liquid and ash slurry directly thereon, and the likelihood of aquatic algae growth in the greenhouse that could both rob plants of vital $CO_2$ for accelerated growth rates, but also become toxic to the plants themselves.

Based on this review of related research, it is clear that a solution is needed that can handle large amounts of $CO_2$ from a wide range of utility and industrial combustors and boilers in an enclosed and controlled environment, efficiently produce a wide range of biomass products and a soil amendment product without the need for significant drying, and requiring as little area as possible to allow location of the system immediately adjacent to the power plant, if possible.

Moreover, it would be desirable to provide a system having improved heat transfer capabilities and improved power plant thermal efficiency with minimal waste of heat. It would be further desirable to provide a system with ash collection and treatment means, greenhouse $CO_2$ controls and emissions monitoring.

OBJECTS AND SUMMARY OF THE INVENTION

It is an object of the present invention to provide a method and system that enables retrofitting any conventional combustion plant emitting $CO_2$-laden combustion or flue gases to sequester carbon emissions.

It is another object of the present invention to provide a method and system that optimizes the process of photosynthesis to capture $CO_2$ while producing products beneficial to the surrounding community.

It is yet another object of the present invention to provide a method and system that maximizes the removal of acid gases and trace pollutants from fuel burning power plant flue gases by condensation, while cooling the flue gas for use in the process of photosynthesis, thus minimizing (or even eliminating) the need for expensive acid gas scrubbers.

It is still another object of the present invention to provide a method and system that recovers the latent heat of condensing flue gas by heating incoming combustion air for increasing thermal efficiency or by heating wastewater treatment sludge to be co-combusted in the system as a total community waste disposal solution, as disclosed in commonly owned U.S. Pat. No. 6,279,493.

It is a further object of the present invention to provide a method and system that treats the condensate such that it can be used as a source of water required by the process of photosynthesis and as a soil conditioner for satisfying the increased demand of nutrients caused by higher uptake of $CO_2$ at the relatively high concentrations contained in the cooled and cleaned flue gas.

It is a further object of the present invention to provide a method and system that encloses the photosynthetic process in a greenhouse facility constructed with chemically stable ash materials which would have otherwise been landfilled, thereby achieving true zero disposal of the system.

It is a further object of the present invention to provide a method and system that utilizes a booster fan for existing plants or a higher discharge pressure induced draft fan for new plants for pressurization of the system.

It is a further object of the present invention to provide a method and system that provides computer-controlled lighting systems to maximize $CO_2$ uptake and crop production.

It is a further object of the present invention to provide a method and system that integrates greenhouse facility lighting design with architectural design for pleasing visual effects in many different applications.

It is a further object of the present invention to provide a method and system that produces biomass fuel, to offset the combustion of fossil fuels, and food for local markets.

It is a further object of the present invention to provide an improved design for automated harvesting of greenhouse products including both discharge of carbon-maximized soils for transport to areas where carbon-deficient soils exist, and delivery of above-soil biomass for co-combustion with coal to allow more fossil carbon resources to remain sequestered in the earth.

It is a further object of the present invention to provide a method and system that diffuses the clean, cooled flue gas into a greenhouse at the bottom under the soil, such that gas is drawn up through the soil first before passing through a membrane to the above-soil plants, such approach to avoid the risk of algae growth and toxic contamination prevalent in aquatic growth systems.

It is a further object of the present invention to provide a method and system including gas flow controls to allow fluctuation of gas flow to coincide with the opening and closing of plant stomata as part of the natural growth cycle.

It is a further object of the present invention to provide a method and system that utilizes continuous emission monitoring of $CO_2$ and oxygen in the incoming gas stream and the gas stream exiting a greenhouse to demonstrate true carbon uptake and increased oxygen emissions.

It is a further object of the present invention to provide a method and system that utilizes new land use and "green construction" practices to enable placement of the system close to urban corridors and brownfield sites to take advantage of heating and cooling demands without the fear of pollution from emissions.

It is yet another object of the present invention to place a heat exchanger downstream of a power plant's ash particulate removal devices to allow the heat exchanger to have high heat transfer capacity for greater efficiency in cooling the flue gas and condensing water vapor and acid gases, as well as higher operating reliability.

It is still another object of the present invention to provide a system that collects the ash separately and allows metering of ash into the condensate treatment tank in a controlled way that balances the pH of the system, provides nutrients to the solution, but does not have excessive ash content.

A system for sequestering carbon emissions from a fuel combustor, according to the present invention, generally includes a combustion gas extraction module for extracting combustion gas from a fuel combustor and a greenhouse facility for receiving the extracted combustion gas and having at least one vegetation supporting soil bed for absorbing carbon dioxide from the received combustion gas. The extraction module includes a particulate removal unit for removing pollutants from the extracted combustion gas and a heat exchanger in downstream fluid communication with the particulate removal unit for cooling the extracted combustion gas.

In a preferred embodiment, the greenhouse facility includes a plenum disposed beneath the soil bed for diffusing the received combustion gas upwardly through the soil bed. The soil bed may be movable and automatically harvestable. Also, the combustion gas extraction module further preferably includes a condensate treatment unit connected to the heat exchanger for treating condensate removed from the extracted combustion gas by the heat exchanger. The cooled flue gas is preferably bubbled through the treated and buffered condensate in a direct contact chamber that dissolves remaining nitrogen and sulfur based pollutants in the gas stream into elemental nutrients. The nutrient-balanced condensate is preferably delivered to the greenhouse facility and distributed to the soil bed via an underground irrigation system embedded therein.

The present invention is preferably combined on-site with a fuel combustor having a combustion gas outlet and an inlet for receiving pre-heated combustion air and/or waste sludge. The combustion gas extraction module is then connected to the combustion gas outlet of the fuel combustor for extracting carbon dioxide laden combustion gas produced in the fuel combustor. Again the extraction module includes a heat exchanger for removing heat from the extracted combustion gas. In this case, the heat exchanger also transfers the removed heat to a stream of at least one of combustion air and waste sludge. The heat exchanger is further connected to the inlet of the fuel combustor for delivering the heated stream to the fuel combustor.

When combined on-site with a fuel combustor, the system of the present invention may further include an ash processing module connected to the fuel combustor for extracting and processing combustion ash by-products produced in the fuel combustor. The ash processing module may further be connected to the particulate removal unit for extracting and processing ash products removed from the combustion gas by the particulate removal unit and the condensate treatment unit for delivering processed ash materials thereto to be combined with the treated condensate.

The present invention further involves a method for sequestering carbon emissions from a combustor. The method generally includes the steps of extracting carbon dioxide laden combustion gas from a combustor, removing pollutants from the extracted combustion gas, removing and recovering heat from the extracted combustion gas after the pollutant removing step and diffusing the cooled combustion gas through a vegetation supporting soil bed of a greenhouse facility, wherein carbon dioxide from the combustion gas is absorbed by the soil bed. Again, the heat removed from the extracted combustion gas is preferably transferred to a stream of at least one of combustion air and waste sludge, which is then delivered to the combustor.

The greenhouse facility preferably includes computer-controlled lighting to accelerate plant growth and maximize carbon dioxide absorption and crop production. The greenhouse soil bed and gas diffusion plenum arrangement is preferably designed to permit automatic harvesting of a carbon saturated soil bed for transport to carbon-deficient agricultural areas and above-soil biomass for co-combustion with other solid fuels to reduce dependence on fossil fuels. The greenhouse facility further preferably includes gas flow controls to allow fluctuation of the incoming gas flow and continuous emission monitoring of carbon dioxide and oxygen in both the incoming gas stream and any gas stream exiting the greenhouse.

The greenhouse facility is preferably located on-site and in fluid communication with the combustor. However, in situations where the greenhouse is situated remote from the combustor, the system preferably includes a combustion gas storage module for storing the processed combustion gas prior to transport to the remote greenhouse facility. The combustion gas storage facility preferably includes a gas compression system, a high pressure gas receiver and a gas delivery control system.

As a result of the present invention, a complete cycle is provided for beneficial use of solid and wastewater treatment waste products for a community with zero disposal, zero emissions (oxygen is not considered an emission), and production of energy and food, while solving the global warming problem. In particular, the present invention closes the loop, from fuel combustion to zero disposal and zero emissions while providing a partial solution to global warming and integrated infrastructure management that is needed in many developing countries. It applies equally to bootstrap the economies of developing countries and for a new generation of architecture in economically established countries.

A preferred form of the system and method for sequestering carbon emissions from a combustor, as well as other embodiments, objects, features and advantages of this invention, will be apparent from the following detailed description of illustrative embodiments thereof, which is to be read in conjunction with the accompanying drawing.

DETAILED DESCRIPTION OF THE PREFERRED EMBODIMENTS

Figure 1:
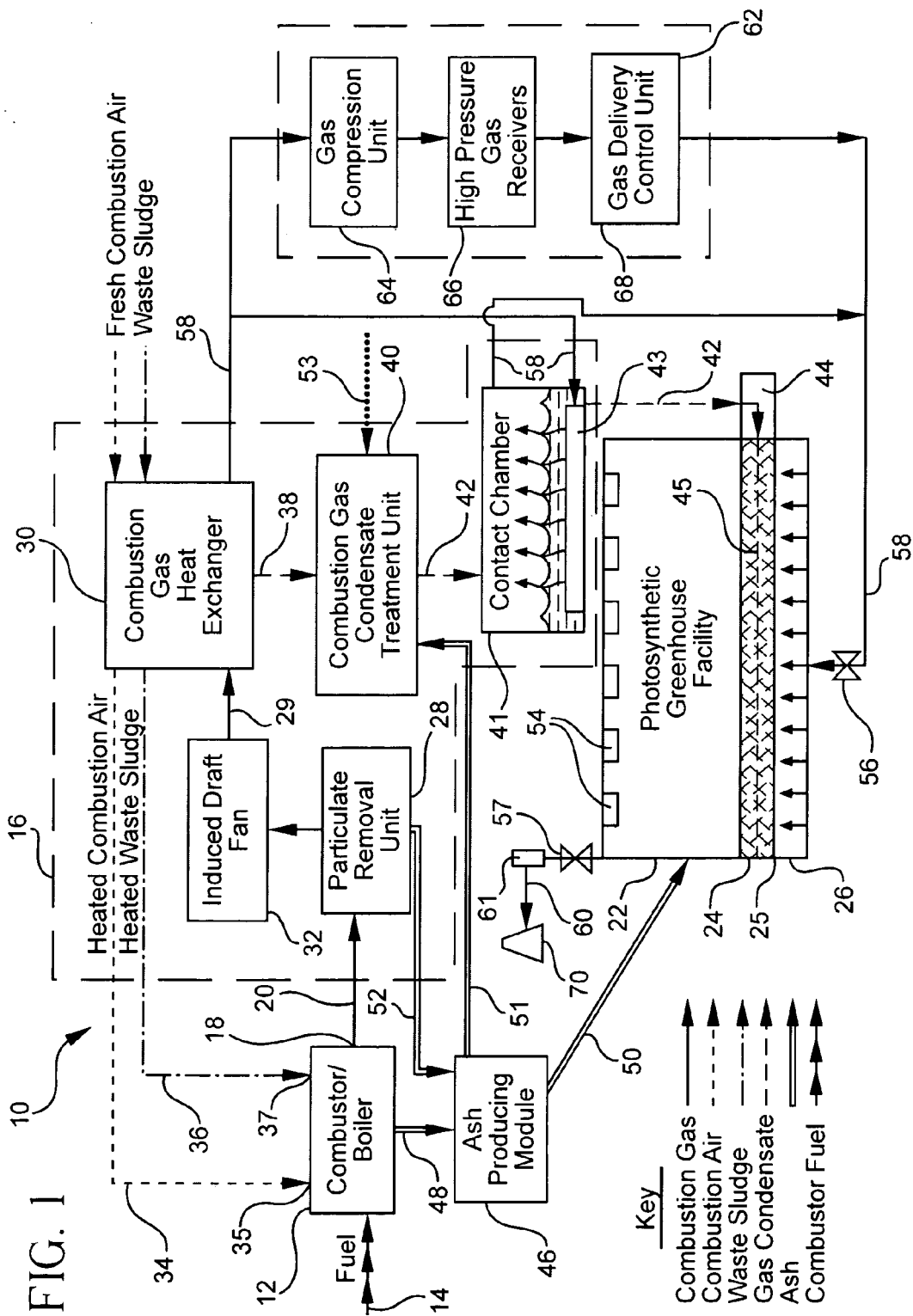
FIG. 1 is a schematic block diagram of a system for sequestering carbon emissions from a combustor formed in accordance with the present invention.

FIG. 1 illustrates a system 10 for sequestering carbon emission from a combustor/boiler 12 formed in accordance with the present invention. The system 10 is primarily described herein as being adapted to a municipal waste combustor, however, the present invention is intended for retrofit to any existing power plant combustor/boiler 12 using any fuel 14 that emits carbon dioxide ($CO_2$)-laden combustion or flue gas to the atmosphere through an air pollution control system, induced draft fan and exhaust stack. The temperature of the exhaust gas from this type of existing facility is generally maintained well above the dew point to avoid condensation of acid gases and to allow rise of the plume farther into the atmosphere for greater dispersion over a wide area.

The system 10 according to the present invention generally includes a combustion gas extraction module 16 communicating with an exhaust outlet 18 of a combustor 12 for extracting the carbon dioxide laden combustion or flue gas 20 produced as a result of a combustion process in the municipal waste combustor and a photosynthetic greenhouse facility 22 for receiving the extracted combustion gas. As used herein, the term "greenhouse facility" is defined as any enclosed space for supporting growth of vegetation or other biomass. The greenhouse facility 22 includes at least one automatically removable soil bed 24 with vegetation for absorbing the carbon dioxide from the received combustion gas. The combustion gas is preferably diffused upwardly through the soil bed 24 via a plenum arrangement 26 disposed beneath the soil bed.

It is widely known that vegetation grows faster under higher concentrations of $CO_2$ in the gas stream, but very little work has been done previously demonstrating that combustion flue gas, with its other pollutants, can achieve a successful accelerated plant growth rate, without which the resulting greenhouse facility 22 would be too large for most applications. Previous research showed a peak $CO_2$ concentration of 1,200 parts per million, above which plants exhibited toxicity and poor growth. However, it has been found that these results were due to inadequate supply of nutrients needed to keep up with the accelerated intake of $CO_2$ and carbon uptake in the plants.

Recent research involving the present invention now confirms dramatic growth rates of more than three times the rate demonstrated in ambient air, at up to 3,000 parts per million $CO_2$ concentration. The research has not yet identified an upper limit to $CO_2$ concentrations, which improves the economic viability of the system dramatically. Growth productivity factors of more than ten times ambient are within reason.

For example, it has been shown that a solid waste resource recovery facility that combusts 240 tons of waste per day can produce over 420 millions pounds of steam per year (equivalent to about 6 MW of electric power) and about 55,000 tons per year of carbon dioxide. The ratio of $CO_2$ to carbon uptake is 44/12 or a factor of 3.67 tons of $CO_2$ per ton of carbon uptake. Therefore, such a facility produces about 15,000 tons per year of carbon equivalent. At a previously published carbon uptake rate of 18.2 tons per acre carbon uptake in ambient air (Piedade et al 1991), a total of about 824 acres would be required for greenhouse space to sequester all of the carbon produced (approximately 137 acres/MW). For a commercial power plant of substantial size, this land use requirement would be prohibitive.

However, assuming 300% productivity improvement for carbon dioxide enrichment from flue gas and three crops per year using well-established computerized lighting techniques, a productivity factor of 9.0 would be achieved and only about 15 acres/MW would be required. Further, utilizing vertical growing systems with multiple levels, the required land use could be even less.

Further, if a power utility were to use the present invention to sequester only 25% of its $CO_2$ emissions, an amount that if applied universally would nevertheless achieve the desired result of stabilizing or reducing atmospheric $CO_2$ concentrations, the required land would only be about 4 acres/MW. While this is still a significant land-use requirement, most modern power plants have very large "buffer" zones that would be ideal for this application and land lost to crop production could be returned to carbon-sequestering service. The applicant's ongoing research suggests that even greater productivity increases and therefore even smaller land use requirements are possible when all known factors are synergized and balanced in a practical, commercial system using the present invention. This research has also shown that aquatic-based growth systems, also known as "hydroponic" systems, promote excessive growth of algae in the presence of high $CO_2$ concentrations that can damage or kill plants growing in the greenhouse. This problem is resolved by moving to a soil-based growth system.

In a preferred embodiment, the combustion gas extraction module 16 includes a particulate removal unit 28, such as a fabric filter, for removing pollutants from the extracted combustion gas 20, a heat exchanger 30 for cooling the processed combustion gas 29 prior to entry into the greenhouse facility 22 and a fan system 32 for pressurizing the gas flow in the system 10. The heat removed from the processed combustion gas 29 by the heat exchanger 30 is preferably used to pre-heat combustion air 34 and/or waste sludge 36 entering the combustor 12 via respective inlets 35 and 37. The heat exchanger 30 preferably utilizes a condensation process producing a condensate 38 that can be used as a source of nutrient-rich water in the greenhouse facility 22.

In this regard, it has been found that the design of the heat exchanger 30 should possess a high heat transfer capacity with a multiple pass design. Results indicate that a very high removal rate of hydrochloric acid gases up to 99+% can be achieved in the heat exchanger. As will be described in further detail below, when combined with removal of other pollutants, the demands on modern down-stream acid gas scrubbers, currently required by law as best available control technology, are dramatically reduced, so much so that a case may be made in the future that acid gas scrubbers, costing millions of dollars in capital cost and having very high operating and maintenance costs, may not be necessary using the present invention.

Moreover, the heat exchanger 30 further preferably includes a combustion gas condensate treatment unit 40 for treating the condensate 38 for further safe use in the greenhouse facility. Specifically, acids, such as hydrochloric acid, condensed in the heat exchanger 30 are preferably neutralized. The treated condensate 42 can then be delivered to the greenhouse soil bed 24, for example, via an underground irrigation system 44 including a distribution header 45 embedded within the soil bed.

In a preferred embodiment, prior to delivery to the greenhouse soil bed 24, the pH neutralized condensate 42 is fed to a direct contact chamber 41, where the cooled combustion gas 58 can be bubbled through the liquid condensate via a distribution header 43 having multiple upwardly directed nozzles immersed in the condensate. It has been found that this bubbling process dissolves any remaining acids and/or pollutants, such as NOx or SOx, not previously condensed in the heat exchanger 30. The acids dissolved in the neutralized condensate 42 thus become nutrients of nitrogen and sulfur, which then can be fed to the greenhouse soil bed 24. This also reduces the need for externally added nutrients 53.

The system 10 further preferably includes an ash processing module 46 connected to the combustor 12 for extracting and processing the resultant combustion ash by-products 48 to produce viable building materials 50 for use in the greenhouse facility 22, among other uses. Other processed ash materials 51 may be fed back to the combustion gas condensate treatment system 40 to be combined with the condensate 38 and incoming plant nutrients 53 to produce a slurry, which is subsequently delivered to the soil bed 24, after passing through the direct contact chamber 41, as described above. The ash processing module 46 may further be in communication with the air pollution system 28 of the combustion gas extraction module 16 to extract and process ash products 52 removed from the extracted combustion gas 20.

The greenhouse facility 22 preferably further includes computer-controlled lighting 54 to maximize carbon dioxide absorption and crop production. The greenhouse soil bed 24 and gas diffusion plenum arrangement 26 is preferably designed to permit easy removal of a carbon saturated soil bed for transport to carbon-deficient agricultural areas. The greenhouse facility 22 further preferably includes gas flow controls 56 and 57 to allow fluctuation of the incoming combustion gas flow 58 and continuous emission monitoring of carbon dioxide in both the incoming gas stream 58 and any gas stream 60 exiting the greenhouse. The exiting gas stream 60 is further preferably driven by a booster fan 61 and is returned to the existing boiler stack 70.

The greenhouse facility 22 is preferably located on-site and in fluid communication with the combustor 12. However, in situations where the greenhouse 22 is situated remote from the combustor 12, the system 10 preferably includes a combustion gas storage module 62 for storing the cooled and processed combustion gas 58 prior to transport to the remote greenhouse facility. The combustion gas storage module 62 preferably includes a gas compression unit 64, a high pressure gas receiver 66 and a gas delivery control unit 68.

In operation, the combustion gas extraction module 16 extracts the carbon dioxide laden combustion gas 20 produced as a result of a combustion process in the combustor 12 and delivers the combustion gas to the greenhouse facility 22 wherein the soil bed 24 and any vegetation supported therein absorbs the carbon dioxide in the combustion gas. Within the combustion gas extraction module 16, the combustion gas 20 extracted from the combustor first enters the particulate removal unit 28 where fly ash is removed from the gas stream. The now processed gas stream 29 then enters the combustion gas heat exchanger 30 where the combustion gas is cooled to about 80° F., and acid gases and trace pollutants are removed from the combustion gas prior to entry into the greenhouse facility 22. The heat removed from the processed combustion gas 29 can be used to pre-heat combustion air 34 and/or waste sludge 36 entering the combustor 12. The fan system 32 drives the gas stream through the extraction module 16 and photosynthetic greenhouse facility 22.

Modern air pollution control systems are expensive to construct and operate but are required by law. The present invention can minimize, or even eliminate some of the components of modern air pollution control systems, such as scrubbers, because of the innovative means of condensing and dissolving pollutants, wherein it is no longer necessary to maintain a high gas exhaust temperature.

Moreover, because the processed exhaust gas 29 is intentionally cooled to about 80° F., the overall efficiency of the combustor facility 12 can be increased by recovering the latent heat of condensation through a tubular heat exchanger 30 to heat incoming combustion air 34. Additionally, the heat removed from the processed flue gas 29 can also be used to heat wastewater treatment sludge 36 to be co-combusted with solid fuel boilers. A system and method for co-combusting waste sludge in a solid fuel combustor is shown and described in commonly owned U.S. Pat. No. 6,279,493 to Beaumont et al., the disclosure of which is incorporated by reference. As described in said patent, pre-heating sludge prior to co-combustion improves the atomization characteristics of the sludge for better combustion.

Those skilled in the art will appreciate that the materials of construction of this combustion gas heat exchanger 30 must be able to withstand highly acidic condensate resulting from condensation of any acid gases and trace pollutants that may not be removed by the particulate removal unit 28. The combustion gas heat exchanger 30 must also be able to collect condensate 38 for delivery to the flue gas condensate treatment system 40 in a way that minimizes the amount of time that tubes are in direct contact with condensate. The flue gas condensate treatment system 40 can, for example, utilize a process using fly ash that may be high in lime content to neutralize the condensate 38 and the resulting mixture can be added to the greenhouse soil mix 24 or added to the ash processing system 46 for the manufacturing of ash blocks for construction materials.

The greenhouse facility 22 may take many different forms and the present invention in not limited to any particular embodiment. Using waste materials 50 for construction, or using conventional building materials, the greenhouse 22 can be a conventional greenhouse, as is commonly known, or it can be any number of innovative applications such as the core of a high-rise building (similar to the elevator cores in modern buildings) or it can beneficially rehabilitate brownfield sites on long-abandoned industrial properties. The list of potential applications is unlimited, and new architectural applications will be needed to convert as much $CO_2$ to oxygen as possible.

Regardless of the application, the greenhouse facility 22 of the present invention will have certain common features designed to maximize plant growth products and soil enhancements while protecting public health and the environment. These features include: (1) Introduction of the cooled processed combustion gas 58 through a diffusion network or plenum 26 disposed at the bottom of the greenhouse below the soil layer 24; (2) Supporting the soil layer 24 with a steel or fabric fine mesh 25 that can be moved like a conveyor for rapid removal of vegetation to market and soil and roots to remote soil enhancement projects; (3) Heavy construction using waste materials to allow operation under pressure; (4) Safety interlocks and continuous monitoring instrumentation to control human ingress and egress; (5) Computer-controlled lighting systems 54 to maximize growth of vegetation and uptake of $CO_2$; (6) Normal vent 57 to atmosphere with significantly reduced pollution potential; and (7) Exhaust stack for either use only in the event of an emergency or system malfunction, or, in the case of systems using a smaller fraction of the total flue gas produced, to return the fraction of the gas cleaned by the present invention to the existing exhaust stack.

As a result of the present invention, a system is provided that is designed for reliable operation with proper attention to easy cleaning. The system collects ash separately and allows metering of ash into the condensate treatment tank in a controlled way that balances the pH of the system, provides nutrients to the solution, but does not have excessive ash content. The system further feeds the resulting condensate from below the plants into the soil, which allows much more operational flexibility and less risk of damage to the plants, and which does not require an excess fluid collection and disposal system. Moreover, the system of the present invention can vary the concentration of $CO_2$ in the greenhouse by diluting with fresh air and varying the flow according to the time of day when plant stomata are opening and closing.

Furthermore, the system takes advantage of co-location with a host power plant and is arranged so that growth trays inside the greenhouse move automatically toward a harvesting module that separates above-ground biomass from remaining soil amendment, with the biomass easily delivered to the power plant for co-combustion with the plant's primary fuel and the soil amendment is delivered to soil-poor areas needing remediation. This system has the dramatic potential for achieving an economic payback of capital cost based on the avoided cost of the plant's primary fuel.

Still further, the system provides proper safety interlocks on the greenhouse for human ingress and egress. Because the overall system is designed for automatic flow of growth tables through the greenhouse, human activity inside the greenhouse will be minimized.

Still further, the system delivers the remaining gas back to the existing power plant's exhaust stack in compliance with permit conditions. Even though the emissions will be much cleaner than previously, an emergency backup is needed for a commercially viable system in case of plant malfunction. Finally, the system may utilize construction materials made from ash generated at the plant, thus reducing cost and reducing ash disposal costs.

Although the illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. A system for sequestering carbon emissions from a fuel combustor comprising:
   a combustion gas extraction module for extracting combustion gas from a fuel combustor, said extraction module including a particulate removal unit for removing pollutants from said extracted combustion gas and a heat exchanger in downstream fluid communication with said particulate removal unit for cooling said extracted combustion gas; and
   a greenhouse facility for receiving the extracted combustion gas and having at least one vegetation supporting soil bed for absorbing carbon dioxide from the received combustion gas, wherein said greenhouse facility includes a plenum disposed beneath the soil bed for diffusing the received combustion gas upwardly through the soil bed.

2. A system as defined in claim 1, further comprising a combustion gas storage module for storing the cooled combustion gas from said heat exchanger prior to transport to said greenhouse facility, said storage module including a gas compression unit, a high pressure gas receiver and a gas delivery control unit.

3. A system for sequestering carbon emissions from a fuel combustor comprising:
   a combustion gas extraction module for extracting combustion gas from a fuel combustor, said extraction module including a particulate removal unit for removing pollutants from said extracted combustion gas and a heat exchanger in downstream fluid communication with said particulate removal unit for cooling said extracted combustion gas; and
   a greenhouse facility for receiving the extracted combustion gas and having at least one vegetation supporting soil bed for absorbing carbon dioxide from the received combustion gas,
   wherein said combustion gas extraction module further comprises a condensate treatment unit connected to said heat exchanger for treating condensate removed from the extracted combustion gas by said heat exchanger.

4. A system as defined in claim 3, wherein said greenhouse facility further comprises an underground irrigation system embedded within said soil bed for receiving the treated condensate from said condensate treatment unit and delivering the treated condensate into said soil bed.

5. A system as defined in claim 3, wherein said combustion gas extraction module further comprises a direct contact chamber connected to said condensate treatment unit and said heat exchanger for receiving said treated condensate from said condensate treatment unit and for bubbling said cooled combustion gas received from said heat exchanger through said treated condensate, whereby acids present in said cooled combustion gas are dissolved in said treated condensate.

6. In combination:
   a fuel combustor having a combustion gas outlet and an inlet;
   a combustion gas extraction module connected to said combustion gas outlet of said fuel combustor for extracting carbon dioxide laden combustion gas produced in said fuel combustor, said extraction module including a heat exchanger for removing heat from the extracted combustion gas and for transferring said removed heat to a stream of at least one of combustion air and waste sludge, said heat exchanger being further connected to said inlet of said fuel combustor for delivering said heated stream to said fuel combustor; and
   a greenhouse facility for receiving the cooled extracted combustion gas from said extraction module and having at least one vegetation supporting soil bed for absorbing carbon dioxide from the received combustion gas.

7. A combination as defined in claim 6, wherein said combustion gas extraction module further comprises a particulate removal unit in upstream fluid communication with said heat exchanger for removing pollutants from said extracted combustion gas prior to being cooled by said heat exchanger.

8. A combination as defined in claim 6, wherein said greenhouse facility includes a plenum disposed beneath the soil bed for diffusing the received combustion gas upwardly through the soil bed.

9. A combination as defined in claim 6, wherein said combustion gas extraction module further comprises a condensate treatment unit connected to said heat exchanger for treating condensate removed from the extracted combustion gas by said heat exchanger.

10. A combination as defined in claim 9, wherein said greenhouse facility further comprises an underground irrigation system embedded within said soil bed for receiving the treated condensate from said condensate treatment unit and delivering the treated condensate into said soil bed.

11. A combination as defined in claim 9, wherein said combustion gas extraction module further comprises a direct contact chamber connected to said condensate treatment unit and said heat exchanger for receiving said treated condensate from said condensate treatment unit and for bubbling said cooled combustion gas received from said heat exchanger through said treated condensate, whereby acids present in said cooled combustion gas are dissolved in said treated condensate.

12. A combination as defined in claim 6, further comprising an ash processing module connected to said fuel combustor for extracting and processing combustion ash by-products produced in said fuel combustor.

13. A combination as defined in claim 12, wherein said combustion gas extraction module further comprises a particulate removal unit in upstream fluid communication with said heat exchanger for removing pollutants from said extracted combustion gas prior to being cooled by said heat exchanger, said ash processing module being further connected to said particulate removal unit for extracting and processing ash products removed from the combustion gas by said particulate removal unit.

14. A combination as defined in claim 12, wherein said combustion gas extraction module further comprises a condensate treatment unit connected to said heat exchanger for treating condensate removed from the extracted combustion gas by said heat exchanger, said ash processing module being further connected to said condensate treatment unit for delivering processed ash materials thereto to be combined with said treated condensate.

15. A method for sequestering carbon emissions from a combustor comprising the steps of:
   extracting carbon dioxide laden combustion gas from a combustor;
   removing pollutants from said extracted combustion gas;
   removing heat from said extracted combustion gas; and
   diffusing said cooled combustion gas through a vegetation supporting soil bed of a greenhouse facility, wherein carbon dioxide from said combustion gas is absorbed by said soil bed.

16. A method as defined in claim 15 further comprising the steps of:
  transferring said heat removed from said extracted combustion gas to a stream of at least one of combustion air and waste sludge; and
  delivering said heated stream to said combustor.

17. A method as defined in claim 15, wherein said cooled combustion gas is diffused upwardly through said soil bed via a plenum disposed beneath the soil bed.

18. A method as defined in claim 15, further comprising the steps of:
  removing condensate from said combustion gas during said heat removal step;
  treating said condensate; and
  delivering said treated condensate to said soil bed.

19. A method as defined in claim 18, further comprising the step of bubbling said cooled combustion gas received from said heat exchanger through said treated condensate, whereby acids present in said cooled combustion gas are dissolved in said treated condensate.

20. A method as defined in claim 15, further comprising the steps of;
  extracting ash by-products from said fuel combustor; and
  processing said ash products to produce a viable material.

21. A method as defined in claim 20, further comprising the steps of:
  removing condensate from said combustion gas during said heat removal step;
  treating said condensate;
  combining said treated condensate with said processed ash products;
  adding a plant nutrient to said combined condensate and ash products to produce a slurry; and
  delivering said slurry to said soil bed.

22. A method as defined in claim 15, further comprising the steps of:
  controlling the lighting within said greenhouse facility to maximize growth of vegetation; and
  varying the flow of said diluted combustion gas according to the time of day.

* * * * *